T. L. TITUS.
FLUID PRESSURE VALVE.
APPLICATION FILED JUNE 27, 1918. RENEWED APR. 23, 1919.

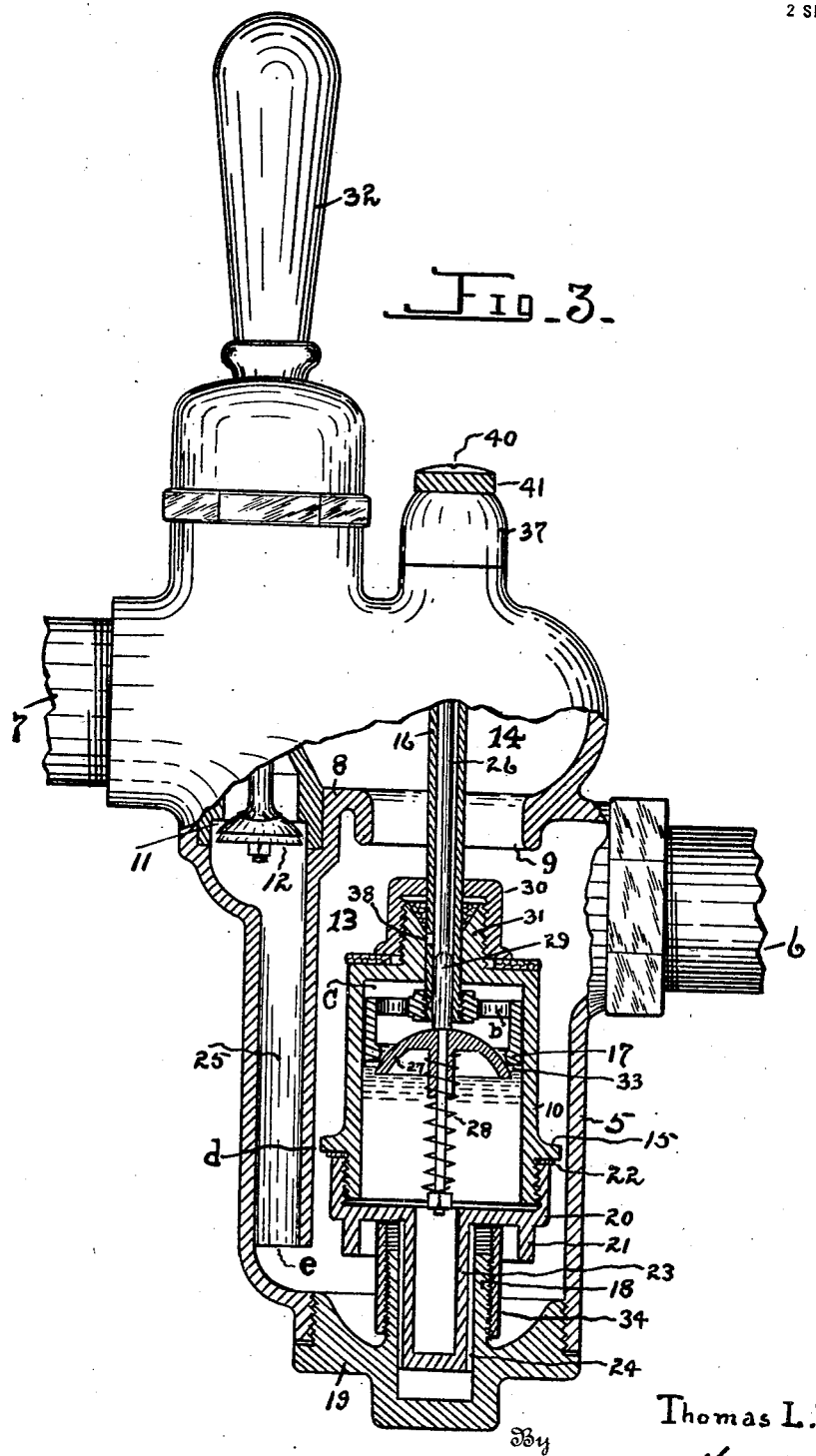

1,319,022.

Patented Oct. 14, 1919.
2 SHEETS—SHEET 1.

Inventor
Thomas L. Titus,
Hiram A. Sturges,
Attorney

By

UNITED STATES PATENT OFFICE.

THOMAS L. TITUS, OF OMAHA, NEBRASKA, ASSIGNOR TO TITUS VALVE COMPANY, OF OMAHA, NEBRASKA, A CORPORATION.

FLUID-PRESSURE VALVE.

1,319,022. Specification of Letters Patent. Patented Oct. 14, 1919.

Application filed June 27, 1918, Serial No. 242,235. Renewed April 23, 1919. Serial No. 292,174.

*To all whom it may concern:*

Be it known that I, THOMAS L. TITUS, a citizen of the United States, residing at Omaha, in the county of Douglas and State of Nebraska, have invented certain new and useful Improvements in Fluid-Pressure Valves, of which the following is a specification.

This invention relates to an improvement in fluid pressure valves of the class employing an oil-resistance chamber for a control of the main valve, and has for its object broadly, to provide a valve which may be conveniently and economically manufactured, will consist of parts which may be readily assembled or detached, will be durable in wear, and which may be adjusted for use in connection with a fluid having various degrees of pressure.

The invention consists of the novel construction, combination and arrangement of parts as described herein and claimed, and as illustrated in the accompanying drawings, wherein,—

Figure 2:
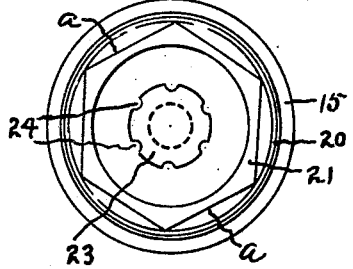
Figure 1:
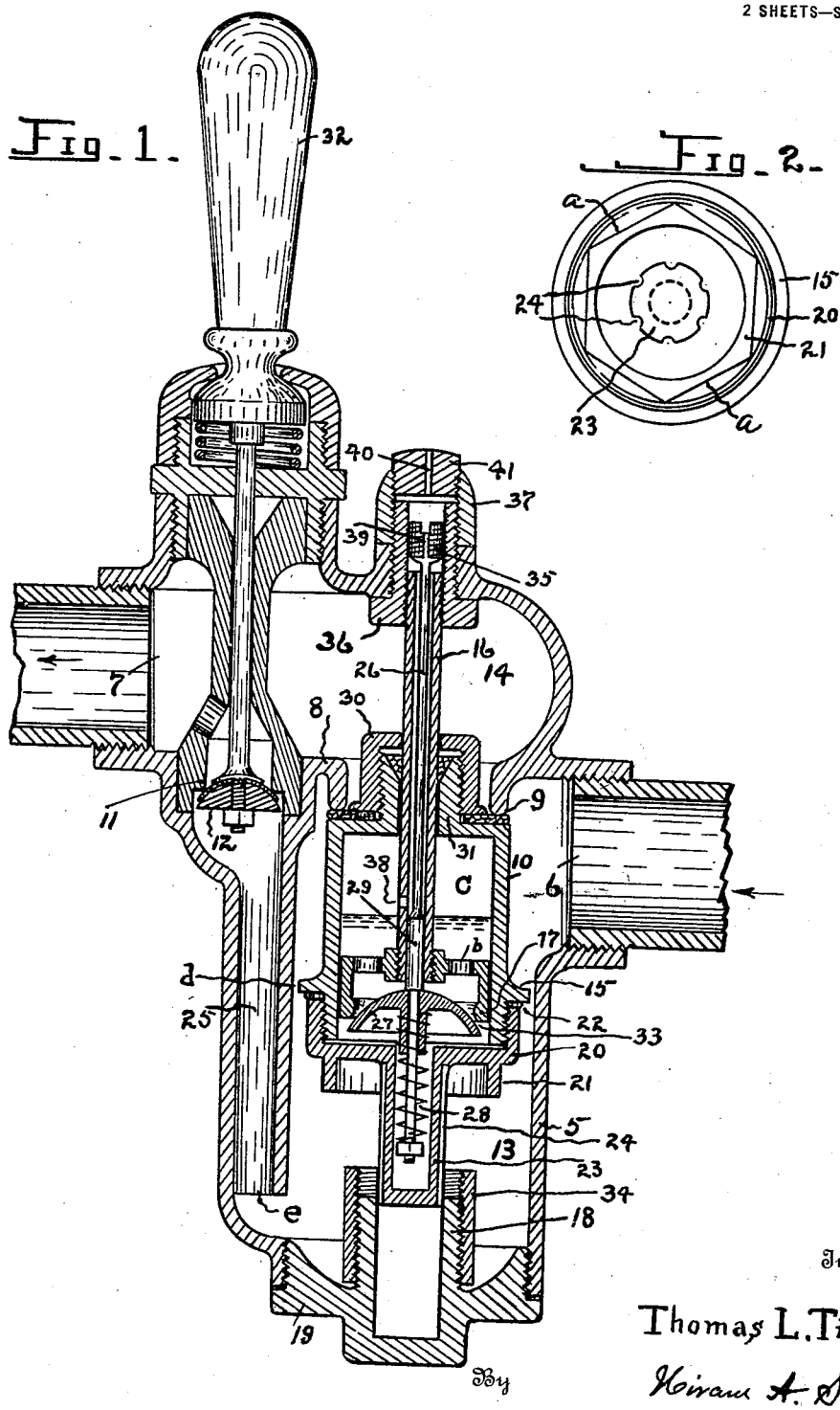

Figure 1 is a view of the valve in longitudinal section, the main valve being disposed on its seat. Fig. 2 is a bottom plan view of the main valve. Fig. 3 is a view of the valve partly in section, the main valve being open.

While the valve may have various uses it is particularly well adapted for use as a flush valve, and consists, in part, of an upright casing 5 having an intake port 6, a discharge port 7, and a partition 8 between said ports which is provided with a valve seat 9 for a main valve 10 and a valve seat 11 for a relief valve 12, whereby a chamber 13 is provided on the pressure side, and a chamber 14 is provided communicating directly with the flush line and normally devoid of pressure.

The present invention discloses means for a control of the movements of the main valve relating to its speed, also to a control of the direction of its movements, and the distance to which it may move, also to means tending to prevent vibration and objectionable noise usually attending the operation of valves, and means for confining the oil within the oil chamber.

The valve 10 is formed as a cylindrical receptacle and is provided, transversely, with an endless flange 15 of uniform width, said flange preferably being disposed between the ends of the valve. Numeral 16 indicates a sleeve which is stationary with the top of the casing and which traverses the main valve seat 9 at substantially its center, its inner end, within the valve 10, being provided with an annular valve seat 17.

Numeral 18 indicates a tubular guide disposed with the center of its bore in line with the center of the main valve seat, said guide being a part of the bottom screw-plate 19 of the casing and projecting inwardly of the chamber 13. The lower end of the valve 10 is formed by use of an inverted screw-cap 20 provided with a depending threaded collar 21 formed with opposed facets *a* as best shown in Fig. 2, so that by using a wrench, it may be suitably secured to the bottom of the valve for compressing the packing 22 to prevent water from entering the valve chamber. The inverted screw-cap 20 is provided, to project below its bottom, with a cylindrical extension 23 constantly engaging in the tubular guide, its longitudinal axis therefore being maintained in line with the longitudinal axis of the valve 10; and it is provided with numerous grooves 24 formed longitudinally therein which extend its entire length.

Numeral 25 indicates an auxiliary passageway communicating with the pressure side of the valve and also communicating with the discharge port 7, subject to the control of the valve 12.

Disposed in the sleeve 16 is a valve-stem 26 having a length sufficient to project within the cylindrical extension 23; and mounted on the stem is a retarding-valve 27, said valve being adapted to have a slidable movement on the stem subject to the resistance of a spring 28 carried by the valve stem, said spring having sufficient force to support the weight of the valve 27 and also to maintain it, normally, in engagement with the lower end of the alining cylinder or boss 29 of the stem, said boss being disposed within and having a part projecting below the end of the sleeve.

As thus described, when the valve 10 is reciprocated on its stem there will be no friction except the limited degree caused by the packing-nut 30 and the projection 31 of said valve 10 upon the sleeve 16, and the contact of the inner wall of the valve 10 with the stationary valve seat 17.

When the release valve is opened by use of the handle 32, the valve 10 will slide substantially to the position shown in Fig. 3, the oil passing the valve-seat 17 through the annular way 33 and apertures b, the spring 28 permitting the way 33 to be materially enlarged, and the extension 23 moving downwardly within the tubular guide 18, the water passing outwardly of the latter into chamber 13 through the grooves 24, the valve 10 being maintained in line with the center of the valve seat 9, and the flange 15 being prevented from engaging the walls of the casing, this operation being practically free from vibration or objectionable noise which is often caused by contact of metallic parts.

Since the pressure of water is not uniform in all localities or upon different floors of a building, a stop-member 34 is provided, consisting of a sleeve which is threaded upon the tubular guide 18; and this may be rotated for its adjustments for controlling the distance to which the valve 10 may move from its seat, and therefore controlling the volume of water which may pass the valve seat 9.

It is understood to be an advantage, of course, to maintain the annular flange 15 closely adjacent to the walls of the casing, and the fact that there will be no actual contact or wear of these parts is a feature of importance relating to durability.

The parts mentioned for a control of the valve 10 are of equal importance when it moves to its seat, the movement of the oil from the lower to the upper side of the valve 27 operating to retard said movement. If it is desired to permit the valve 10 to move more quickly to its seat 9, the valve-stem 26 may be adjusted longitudinally, since its head 35 is threaded in the bushing 36 of the dome 37. If the water pressure is of limited degree, the space between the valve 27 and its seat 17 may be decreased, by the above adjustment, so that the flushing will continue for, comparatively, a longer period.

In the present instance, air is admitted to the chamber C of the valve 10 by means of an aperture 38 formed in the sleeve 16 above the oil in the chamber, the slot 39 formed in the head 35 of the stem, and the aperture 40 formed in the removable plug 41 of the dome, the diameter of the stem 26 above the boss, being less than the bore of the sleeve, this ingress and egress of air being of advantage and quite necessary to permit a suitable movement of the valve 10 upon the sleeve 16, and to prevent a movement of the oil outwardly of the chamber C which otherwise would be occasioned by suction.

It will be understood that, in order to unseat the main valve 10, the volume of water which passes the valve 12 must be greater than the volume which passes the annular area d from the intake 6 to the auxiliary passageway 25, the latter having a sufficient length so that its intake e will be disposed near the bottom of the casing or at least below the flange 15, and according to this construction the annular area d may be increased if desired, the bore of the passageway being also increased. This feature will be appreciated since all grinding or milling of the inner walls of the casing or flange 15, which adds to the cost of manufacture, may be dispensed with.

What I claim as new and desire to secure by Letters Patent is:—

1. In a fluid pressure valve, an upright casing having an intake port, a discharge port, a main valve seat on its pressure side and a tubular guide disposed in alinement with the center of the main valve seat opening inwardly from its bottom, and also having an auxiliary passageway leading to the discharge port from the pressure side, said passageway having a valve seat, a sleeve connected with the top of the casing and extending through the main valve seat in line with the tubular guide and having a valve seat, a cylindrical container normally closing the main valve seat, said container having bearings on the sleeve and having a cylindrical projection engaging in the tubular guide, a valve rod longitudinally adjustable within the sleeve and provided with a boss projecting beyond the end of the sleeve, a spring valve mounted to permit slidable movements on the valve rod and normally disposed adjacent to the valve seat of the sleeve in engagement with said boss, and a release valve for the valve seat of the auxiliary passageway adapted to be actuated for causing the cylindrical container to move from the main valve seat.

2. In a fluid pressure valve, an upright casing having an intake port, a discharge port, a main valve seat on its pressure side and a tubular guide disposed in alinement with the axis of the main valve seat opening inwardly from its bottom and also having an auxiliary passageway leading to the discharge port from the pressure side, said passageway having a valve seat, a sleeve connected with the top of the casing and extending through the main valve seat in line with the tubular guide and having a valve seat, a cylindrical container normally closing the main valve seat said container having bearings on the sleeve and having a flange projecting outwardly from its cylindrical wall toward the wall of the casing and having a cylindrical projection engaging in the tubular guide, a valve rod longitudinally adjustable within the sleeve and provided with a boss, a spring valve mounted to permit slidable movements on the valve rod and normally disposed adjacent to the valve seat of the sleeve in engagement with said boss, and a release valve for the valve seat of the auxiliary passageway adapted to be actuated for causing the cylindrical container to move from the main valve seat, the cylindrical projection of said container moving in said guide to maintain said container in line with the axis of the sleeve and to prevent engagement of said flange with said casing.

3. In a fluid pressure valve, a casing having an intake port, a discharge port, a main valve seat between said ports, and having a passageway for a communication with said discharge port, said passageway having a port in constant communication with said intake port, a relief valve normally closing said passageway, a sleeve traversing the main valve seat, said sleeve being stationary with the casing and provided with a valve seat, an oil-containing valve movable on the sleeve for closing the main valve seat, a valve rod provided with a boss and disposed in the sleeve, a spring-valve having bearings on the valve rod and disposed adjacent to the valve seat of the sleeve in normal engagement with said boss, said release valve being movable for causing the oil-containing valve to move from its seat.

4. In a fluid pressure valve, a cylindrical casing having an intake port, a discharge port, a main valve seat between said ports, and provided with a passageway opening on the discharge port having a port in constant communication with said intake port, a sleeve traversing the main valve seat, said sleeve being stationary with the casing and provided at its inner end with a valve seat, a cylindrical oil-containing valve provided with an annular flange, said valve having bearings on the sleeve with its flange disposed adjacent to the wall of the casing and being movable on the sleeve for closing the main valve seat, a valve rod provided with a boss and disposed in the sleeve, a spring valve having bearings on the valve rod and disposed adjacent to the valve seat of the sleeve in normal engagement with said boss, and a release valve normally closing said passageway and being movable for causing the oil-containing valve to move from its seat.

5. In a fluid pressure valve, a cylindrical casing having an intake port, a discharge port, a main valve seat between said ports, and provided with a tubular guide on the pressure side disposed in line with the longitudinal axis of the main valve seat, a passageway opening on the discharge port having a port in constant communication with said intake port, a sleeve traversing the main valve seat, said sleeve being stationary with the casing and provided at its inner end with a valve seat, a cylindrical oil-containing valve provided with an outwardly projecting annular flange and having a cylindrical projection disposed in line with its longitudinal axis engaging in the tubular guide and having bearings on the sleeve to permit a slidable movement thereof for closing the main valve seat, a valve rod provided with a boss and disposed in the sleeve, a spring-valve having bearings on the valve rod and disposed adjacent to the valve of the sleeve in normal engagement with said boss, a release valve normally closing said passageway and being movable for causing the oil-containing valve to move from the main valve seat, the projection of said oil-containing valve moving inwardly of the tubular guide to maintain the axis of said oil-containing valve in line with the axis of the valve seat, said flange moving adjacent to the wall of the casing.

6. In a fluid pressure valve, an upright cylindrical casing having an intake port, a discharge port, a main valve seat between said ports, and provided with a passageway opening on the discharge port having a port in constant communication with said intake port, a sleeve traversing the main valve seat, said sleeve being stationary with the casing and provided at its inner end with a valve seat, a cylindrical valve having a fluid-containing chamber in communication with the atmosphere and provided with an endless flange projecting outwardly of its convexed wall, said valve having bearings upon the sleeve and adapted to have a movement for closing the main valve seat, a valve rod provided with a boss, said rod being disposed within the sleeve and being adjustable longitudinally for moving its boss a predetermined distance beyond the end of the sleeve, a spring-valve having bearings on the valve rod and disposed adjacent to the valve seat of the sleeve in normal engagement with said boss, a release valve normally closing said passageway and being movable for causing the cylindrical valve to move from its seat, and means to maintain the flange of the cylindrical valve equi-distant from the upright wall of the cylindrical casing.

7. In a fluid pressure valve, an upright cylindrical casing having an intake port, a discharge port, a main valve seat between said ports, and provided with an auxiliary passageway opening on the discharge port having an intake port in communication with the intake port of said casing, a sleeve traversing the main valve seat, said sleeve being stationary with the casing and provided at its inner end with a valve seat, a cylindrical valve having bearings on the sleeve and normally disposed on the main valve seat and having a fluid-containing chamber in communication with the atmosphere, said cylindrical valve having an outwardly projecting flange between the intake port of the casing and the intake port of said passageway and providing an annular passageway between its terminal and the concaved side of the casing, a valve rod provided with a boss, said rod being disposed within and being adjustable longitudinally of the sleeve, a spring-valve having bearings on the valve rod and disposed adjacent to the valve seat of the sleeve in normal engagement with said boss, a release valve normally closing said auxiliary passageway and being movable for causing the cylindrical valve to move from its seat, the area of the intake port of the auxiliary passageway being greater than the annular area between said flange and the concaved side of the casing.

8. In a fluid pressure valve, an upright casing having an intake port, a discharge port, a main valve seat on its pressure side and a tubular guide disposed in alinement with the center of the main valve seat opening inwardly from its bottom and also having an auxiliary passageway leading to the discharge port, said passageway also having a valve seat and having an intake port communicating with the pressure side, a sleeve connected with the top of the casing and extending through the main valve seat in line with the tubular guide and having an apertured, cylindrical head, a cylindrical container having bearings on the sleeve and normally closing the main valve seat, said container having a cylindrical projection engaging in the tubular guide and provided with an endless flange forming an annular passageway between its terminal and the inner side of the casing intermediate the intake of said casing and the intake port of the auxiliary passageway, a valve rod longitudinally adjustable within the sleeve and provided with a boss, a spring valve mounted to permit slidable movements on the valve rod and normally disposed adjacent to the apertured, cylindrical head of the sleeve in engagement with said boss, and a release valve for the valve seat of the auxiliary passageway adapted to be actuated for causing the cylindrical container to move from the main valve seat, the area of the auxiliary passageway being greater in cross-section than the area in plan of said annular passageway.

9 In a fluid-pressure valve, a cylindrical casing havng an intake port, a discharge port, a main valve seat between said ports, and provided with a tubular guide on the pressure side disposed in line with the center of the main valve seat, an auxiliary passageway opening on the discharge port and having a port in constant communication with said intake port, a sleeve traversing the main valve seat, said sleeve being stationary with the casing and provided at its inner end with a valve seat, a cylindrical oil-containing valve in communication with the atmosphere and provided with a flange projecting outwardly of its convexed wall to form an annular passageway between its perimeter and the wall of said casing, and also provided with a cylindrical projection disposed in line with its longitudinal axis engaging in the tubular guide, and having bearings on the sleeve to permit a slidable movement thereof for closing the main valve seat, a valve rod provided with an alining cylinder, said rod being adjustable longitudinally and disposed within the sleeve, its alining cylinder engaging the walls and projecting beyond the end of said sleeve, a spring valve having bearings on the valve rod and disposed adjacent to the valve seat of the sleeve in normal engagement with said alining cylinder, a release valve normally closing the auxiliary passageway and being movable for causing the oil-containing valve to move from the main valve seat, the projection of said oil-containing valve moving inwardly of the tubular guide to maintain the axis of the last named valve in line with the center of the main valve seat and to maintain said flange equi-distant from the wall of the casing, the area in cross-section of said auxiliary passageway being greater than the area of said annular passageway.

In testimony whereof, I have affixed my signature in presence of two witnesses.

THOMAS L. TITUS.

Witnesses:
  HIRAM A. STURGES,
  ARTHUR H. STURGES.

Copies of this patent may be obtained for five cents each, by addressing the "Commissioner of Patents, Washington, D. C."